T. PILKINGTON.
CUTTING TOOL.
APPLICATION FILED JAN. 25, 1916.
1,192,110.
Patented July 25, 1916.
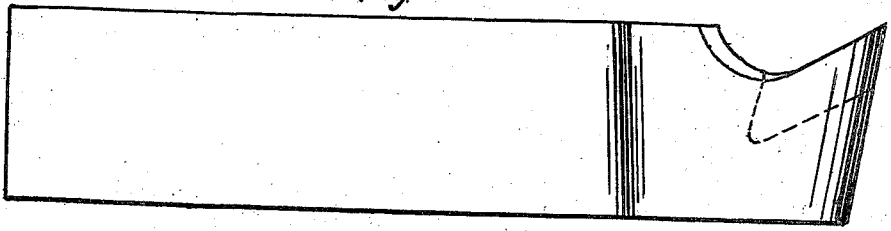
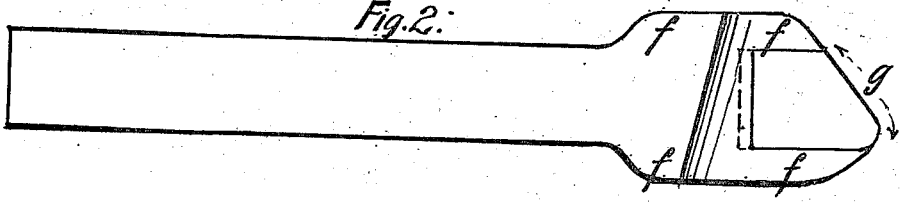

UNITED STATES PATENT OFFICE.

THOMAS PILKINGTON, OF WILKINSBURG, PENNSYLVANIA.

CUTTING-TOOL.

1,192,110.   Specification of Letters Patent.   Patented July 25, 1916.

Application filed January 25, 1916. Serial No. 74,109.

*To all whom it may concern:*

Be it known that I, THOMAS PILKINGTON, a subject of the King of Great Britain and Ireland, residing at and whose postal address is 823 North avenue, Wilkinsburg, in the county of Allegheny, State of Pennsylvania, have invented certain new and useful Improvements in Cutting-Tools, of which the following is a specification.

This invention is for increasing the durability and wearing qualities of cutting tools, which are used more particularly for cutting metals, by providing increased strength and improved means for conducting to the tool holder or tool body the heat generated at and near the cutting edge, by this means more rapidly reducing the temperature of the cutting edge by dissipating the heat in conduction and radiation to surrounding objects.

In practical work we often find the junction between a tool and its holder defective owing to difficulties and uncertainties in machining, fitting, welding or brazing, and as it is highly desirable that the heat generated at the cutting edge be conducted to the body of the holder, or removed by other means, any defect in the continuity of metallic union between tool and holder is undesirable because of the reduced heat conductivity. In order to increase the heat conductivity between tool and holder several courses are available.

This invention seeks to increase the conductivity between tool and holder by increasing the conducting area of metal joint or weld between the two pieces by welding, brazing or otherwise attaching metal plates or bosses to the sides of the tool and its holder in such a manner as to cover the sides of the tool from its cutting edge or edges and extend beyond the tool and cover a portion of the sides of the holder.

Figures 1 and 2 in the drawing show side elevation and plan of a tool and holder with side plates or bosses already referred to in this specification. These side plates or bosses are lettered $f, f, f, f$, in the plan view and are indicated by shade lines in the side elevation. The cutting edge of the tool is lettered $g$, in the plan view. It will be seen that the bosses or end plates $f, f, f, f,$ extend a short distance only from the tool and leave the body of the holder comparatively small so that the economy due to a small tool rest or toolpost is realized.

It is not intended to restrict the position of the tool with regard to the holder, as the tool may be attached to the extreme end face of the holder and similar means of reinforcement employed.

Having thus fully described my invention I claim as new and desire to secure by Letters Patent:—

1. A cutting tool consisting of a holder bar of metal, a tip of tool steel welded or brazed thereto, and metal reinforcing strips welded, brazed or soldered to the sides of the tip and holder bar so as to increase the vertical cross sectional area of metal in tip and holder bar at the cutting end of the tool.

2. A cutting tool consisting of a bar of metal and a tip of tool steel welded or brazed to the end thereof with metal which also extends to the side or sides of tool steel tip and bar so as to form a reinforcement between tool steel tip and bar.

3. A cutting tool consisting of a bar of metal, together with a tip of hard metal welded or brazed thereto, and a metal boss or bosses welded, brazed or soldered to one or more sides of the tip and holder.

4. A cutting tool consisting of a holder of metal with cutting means of hard metal integrally united thereto, and metal reinforcing strips integrally united to the entire, or the greater part of the side or sides of the cutting means and to a portion of one or both sides of the holder.

5. A cutting tool consisting of a four-sided bar of metal with one end formed to a flat surface which is inclined at any angle to the longitudinal axis of the metal bar, and a tool steel tip of four sided cross section, welded, brazed or soldered thereto, together with one or more bosses of metal, welded, brazed or soldered to the cutting end of the tool in such a manner as to enlarge the cross sectional area of the cutting end.

THOMAS PILKINGTON.

Witnesses:
  WALTER K. ELDER,
  OSCAR F. THOMPSON.